US006978882B2

(12) United States Patent　　(10) Patent No.:　　US 6,978,882 B2
Nagler　　(45) Date of Patent:　　Dec. 27, 2005

(54) DEVICE FOR AUTOMATED MANIPULATION OF ARTICLES

(75) Inventor: Peter Nagler, Fellbach (DE)

(73) Assignee: imt robot AG, Fellbach (DE)

( * ) Notice: Subject to any disclaimer, the term of this patent is extended or adjusted under 35 U.S.C. 154(b) by 0 days.

(21) Appl. No.: 10/709,614

(22) Filed: May 18, 2004

(65) Prior Publication Data

US 2004/0245072 A1　Dec. 9, 2004

(30) Foreign Application Priority Data

Jun. 4, 2003　(EP) .................................. 03012642

(51) Int. Cl.[7] ............................................ B65G 25/04
(52) U.S. Cl. ............................ 198/750.11; 198/468.2
(58) Field of Search .......................... 198/690.2, 692, 198/693, 468.2, 698, 699, 699.1, 750.11

(56) References Cited

U.S. PATENT DOCUMENTS 2,883,172 A * 4/1959 Mitchell .................. 198/699.1
4,346,799 A 8/1982 Dunville et al. ............ 198/367

FOREIGN PATENT DOCUMENTS

| DE | 20203818 | * | 5/2002 |
| FR | 2 725 430 | | 4/1996 |
| JP | 04 039214 | | 2/1992 |
| JP | 06 219548 | | 8/1994 |
| JP | 07 132477 | | 5/1995 |

* cited by examiner

Primary Examiner—James R. Bidwell
(74) Attorney, Agent, or Firm—Gudrun E. Huckett

(57) ABSTRACT

A device for automated manipulation of articles along a predetermined movement path has a working area having a working surface for articles. The device also has a manipulator with a gripping device for moving the articles. The working surface consists of neighboring longitudinal elements, wherein longitudinal gaps are formed between the neighboring longitudinal elements. The griping device has at least one gripping finger that can be lowered into the longitudinal gaps between the neighboring longitudinal elements and moved into a position underneath an article for picking up the article. The article is essentially secured in the gripping device by a combination of acceleration forces generated along a movement path of the gripping device and of the force of gravity.

15 Claims, 4 Drawing Sheets

DEVICE FOR AUTOMATED MANIPULATION OF ARTICLES

BACKGROUND OF INVENTION

1. Field of the Invention

The invention relates to a device for automated manipulation of articles such as meat, fish, poultry or the like along a predetermined movement path. The device is comprised of a working surface for the articles provided in a working area as well as a manipulator arranged within the working area and comprising a gripping device for the articles to be moved, wherein the working surface is comprised of longitudinal elements with longitudinal gaps formed between neighboring longitudinal elements. The gripping device has gripping fingers that can be lowered into the longitudinal gaps between neighboring longitudinal elements of the working surface and can be moved into a position underneath the article for picking up the article.

2. Description of the Related Art

With such devices, articles such as meat, fish, poultry or the like are moved by manipulators such as robots from a first position, for example, on a belt, into a second position, for example, on another belt. For example, cutlets can be lifted off a belt and placed into a retail receptacle on a second belt or a fixed placement position.

Since raw meat, fish, and poultry excrete liquids, there are significant hygienic concerns in connection with using generally known vacuum gripping device. Moreover, such vacuum gripping devices leave contact traces on the articles that may negatively affect the aesthetic appearance of the article.

SUMMARY OF INVENTION

It is an object of the present invention to provide a device for automated manipulation of articles with which high hygienic requirements are to be fulfilled.

In accordance with the present invention, this is achieved in that the article essentially is secured in the gripping device by acceleration forces generated along the movement path of the gripping device in combination with the force of gravity.

By configuring the working surface so as to be comprised of longitudinal elements with interposed longitudinal gaps, the articles are resting on a grid or the like so that the gripping device with a gripping finger can move into the longitudinal gap and move into a position underneath the article. By lifting the gripping device, the article is lifted off the working surface and, along the further movement path to the target location, is safely secured within the gripping device exclusively by the generated acceleration forces in combination with the force of gravity. For placing the articles, the acceleration forces are also used in that the article is released from the gripping fingers by accelerating the gripping device and is deposited by retracting the gripping device. The actions of holding and placing of the article can be enhanced by positioning the center of gravity of the article between an axis of rotation and a rear wall of the gripping device. In this way, the gripping device can be comprised of primarily immobile components that are arranged rigidly on the gripping device so that the gripping device itself has neither joints, adjusting elements nor gaps for allowing movement between parts into which the meat juice or similar liquids could penetrate. The gripping device, comprised exclusively of immobile components, fulfills also highest hygiene requirements and can be cleaned simply and quickly. For example, by means of a simple shower the gripping device can be kept clean even during extended operating periods.

In order to ensure gripping or pick-up also under unfavorable boundary conditions, as in the case of articles positioned closely adjacent to one another, the gripping device can be tilted about a pivot axis that is approximately parallel to the working surface so that an article can be picked up by the gripping devices by a movement similar to that of using a shovel.

Expediently, the lateral surfaces of the gripping device are at least partially closed by lateral support flanges in order to ensure even for great lateral accelerations a safe securing action of the article in the gripping device. In this way, even quick rotational movements about the vertical axis of the manipulator arm can be carried out.

Preferably, the working surface is formed by a strap belt that transports the articles within the working area of the manipulator.

In a further embodiment of the invention, the longitudinal elements and the longitudinal gaps between the longitudinal elements are aligned transversely to the transport direction of the conveyor belt wherein the gripping device for receiving the article moves transversely to the transport direction of the conveyor belt into a position underneath the article. This has the advantage that the free space required for inserting the gripping device on the belt is greatly reduced so that the articles can be placed closer together in this way. Lowering of the gripping device to the level of the belt can be initiated adjacent to the belt in order to then move the gripping device, when entering the longitudinal gaps that extend transversely to the transport direction of the belt, simultaneously in the transport direction of the conveyor belt for picking up the article.

According to another embodiment of the invention, the article can be lifted onto an intermediate support. This is carried out advantageously by a lifting device that is arranged underneath the working surface and is configured to pass between the stays upwardly. The intermediate support is advantageously provided above the working surface.

DETAILED DESCRIPTION

Figure 1:
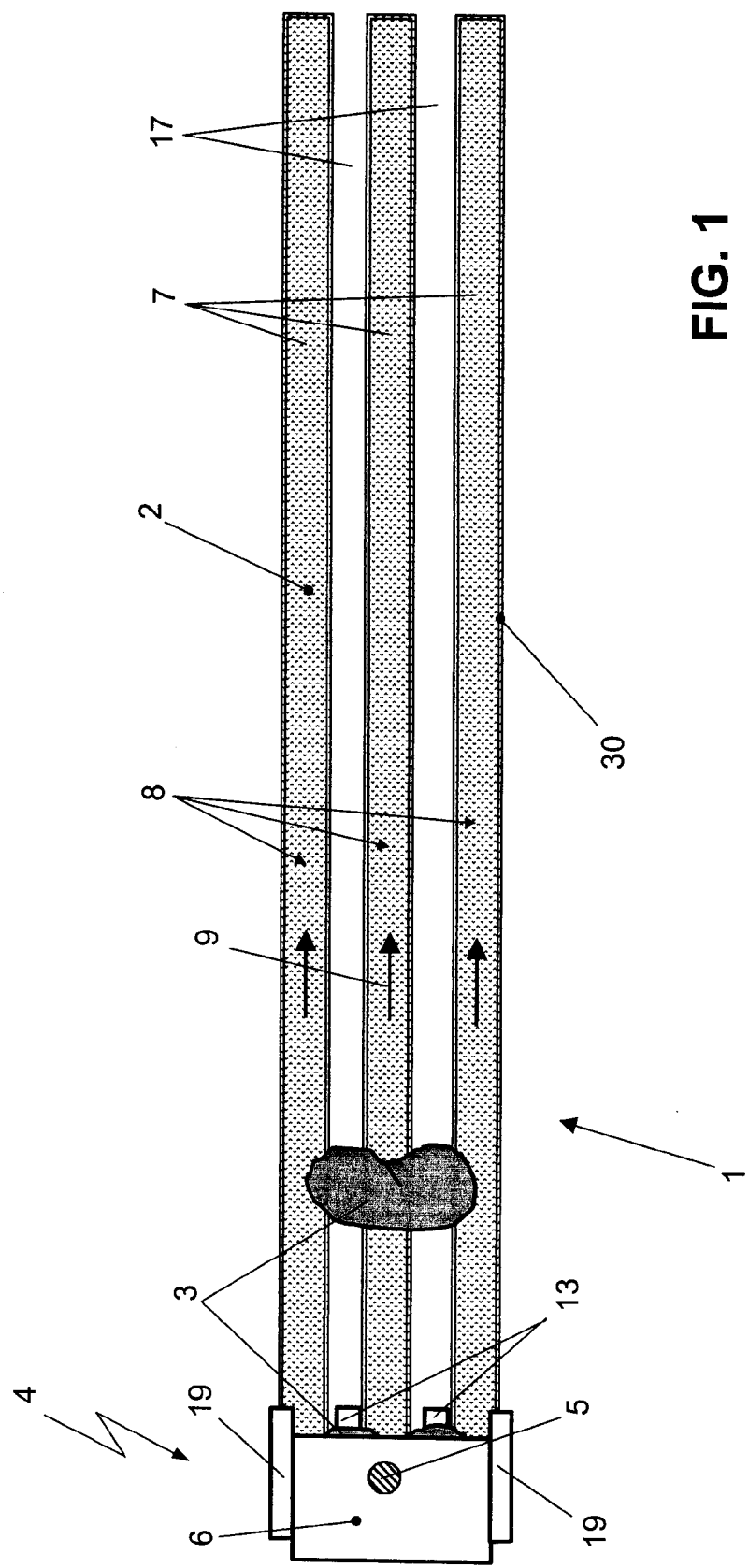
FIG. 1 is a plan view onto the device according to the invention.
Figure 2:
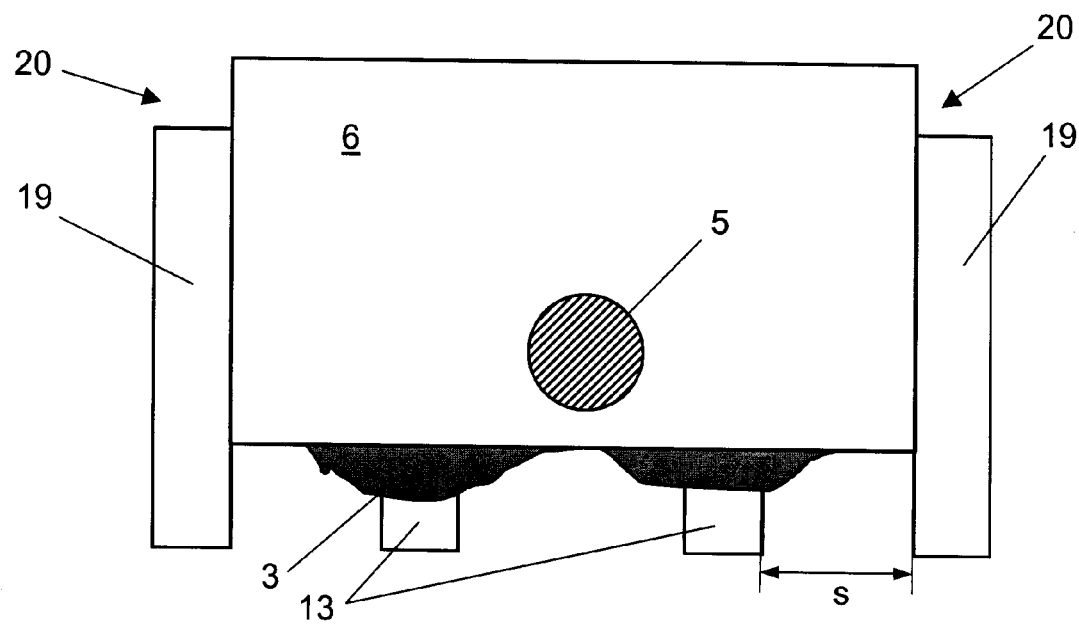
FIG. 2 is a detail plan view onto a gripping device according to the invention.
Figure 3:
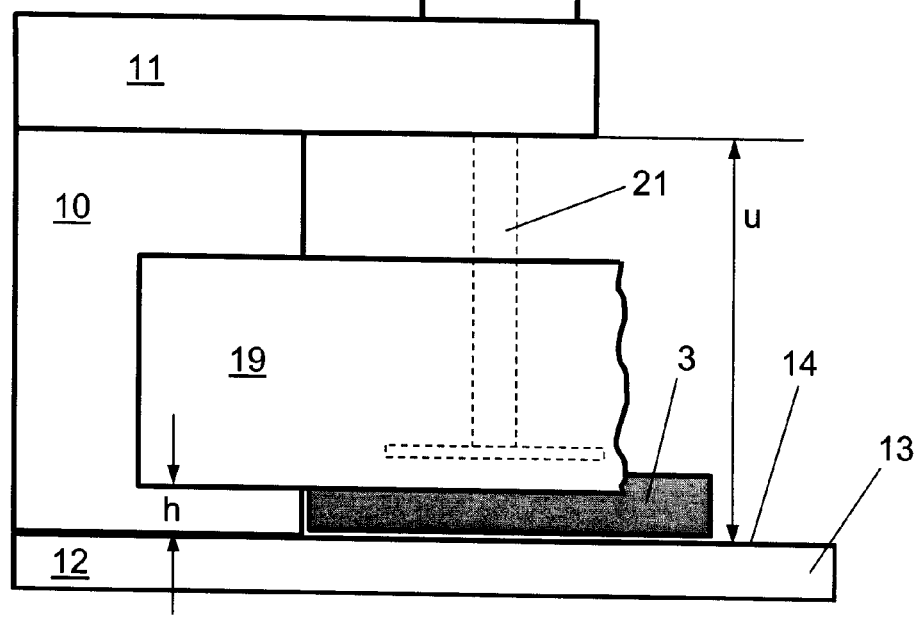
FIG. 3 is a side view of the gripping device of FIG. 2.

The device illustrated in FIG. 1 serves for automated manipulation of articles, for example, pieces of meat (in the form of slices of meat or the like), fish (for example, in the form of filets), poultry (for example, as portioned parts), or similar food articles. The illustrated working area 1 has a working surface 2 for the articles 3 that in the illustrated embodiment are slices of meat (cutlets or the like). In the working area 1, a manipulator 4 is arranged; the end of the manipulator arm 5 as well as the gripping device 6 fastened to the manipulator arm 5 are the only parts of the manipulator 4 that are illustrated. The manipulator can be a robot or a similar device that can pivot and rotate the gripping device and can guide the gripping device along particularly a movement path. The robot movements are expediently predetermined such that acceleration forces act on the picked-up article 3 that can be even a multiple of the acceleration due to gravity.

Figure 7:
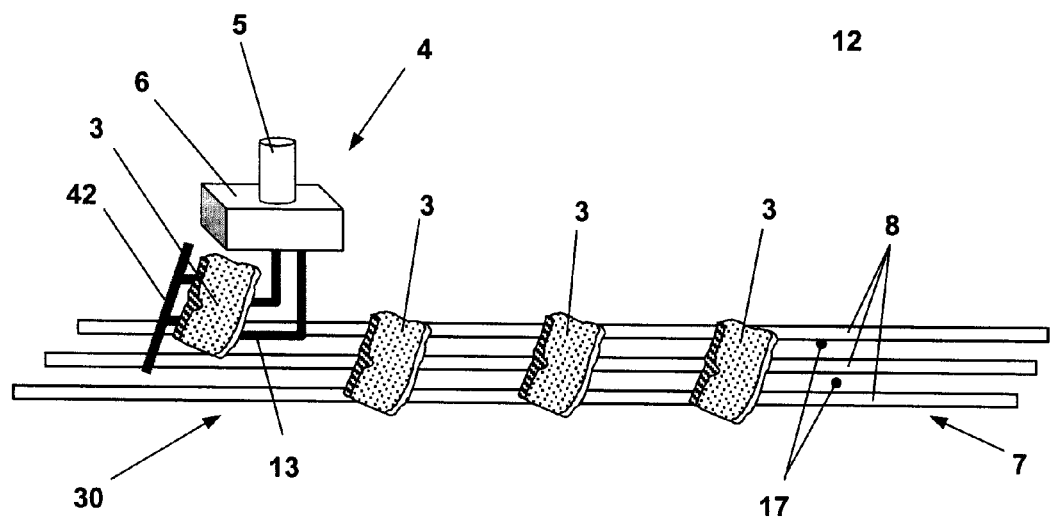
FIG. 7 is a plan view onto the device according to FIG. 6 with a gripping device lifting an article off the intermediate support.

In the illustrated embodiment, the working surface 2 is comprised of longitudinal elements 7 with longitudinal gaps 17 provided between neighboring longitudinal elements 7. The working surface 2 can thus have the shape of a grid or the like, preferably, the working surface is formed by a strap belt as illustrated in FIGS. 1 and 7. The strap belt is comprised of individual straps 8 that form the longitudinal elements 7 and are commonly driven in the transport direction 9. The articles 3 are transported to the working area 1 by means of the strap belt 8 comprised of several straps 8.

The gripping device 6 illustrated in the embodiment has a U-shaped basic configuration wherein the stay 10 of the U determines the receiving width u of the gripping device 6. The upper leg 11 of the U serves as of fastening leg for connecting the gripping device 6 to the manipulator or the manipulator arm 5. The lower leg 12 forms a gripping finger 13 that can be lowered into the longitudinal gaps 17 between neighboring longitudinal elements 7 of the working surface 2, i.e., between the straps 8 of the transport belt. In this way, the support surface 14 of the gripping finger 13 is moved to the level of the plane of the working surface 2 or it is moved slightly below this level for which purpose recesses or undercuts matching the width of the straps 8 are provided in the stay 10. For picking up the article 3, the gripping device 6 moves forwardly in the transport direction 9 of the transport belt wherein the forward movement of the gripping device 6 is faster than the speed of the transport belt in the transport direction 9. In this way, the gripping finger 13 moves underneath the article 3, and the article 3 is lifted off the working surface 2 when the gripping device 6 is moved upwardly. In order to ensure a safe pickup action of the article 3 by means of the gripping device 6, several gripping fingers 13 are advantageously provided that extend approximately parallel and adjacent to one another. In the embodiment according to FIG. 1, two gripping fingers 13 are arranged that form the bottom of the gripping device 6. The gripping fingers 13 are expediently of the same length and engage adjacently positioned longitudinal gaps of the working surface 2.

The gripping fingers 13 are formed to be longer than the fastening leg 11 wherein the configuration is selected such that the connecting area 15 of the fastening leg 11 and the manipulator arm 5 is positioned approximately above the center of gravity of the gripping device 6. The gripping device 6 itself can be tilted about a pivot axis 16 that is approximately parallel to the working surface 2 so that an engagement of the longitudinal gap between two tightly positioned articles 3 is also possible. The gripping device 6 is moreover rotatable about the vertical axis 18 of the manipulator arm 5.

According to a preferred embodiment of the invention, the gripping device 6 is comprised a of components that are arranged rigidly on the gripping device and are immobile relative to one another. This means that the U-shaped base member, comprised of one or several gripping fingers 13, the stay 10 that determined the opening width, as well as the fastening leg 11, is a rigid configuration without moveable parts. This has the advantage that during manipulation of meat articles meat juices or similar liquids cannot flow into gaps provided for movement of the device. The rigid configuration of the gripping device ensures highest hygiene requirements; the gripping device itself can be simply and quickly cleaned.

In order to secure the article 3 within the gripping device 6, the acceleration forces generated when moving the gripping device to the target location are used in combination with the force of gravity. The movement path of the gripping device 6 is predetermined such that the acceleration forces that are generated in combination with the force of gravity ensure a safe fixation of the article in the U-shaped receptacle of the gripping device 6. In order to be able to utilize also decelerations without losing the article, it can be advantageous to slightly pivot the gripping device 6 about the pivot axis 16 so that the contact surface 14 of the gripping fingers 13 is slightly upwardly angled relative to the movement direction. Occurring deceleration forces can then be counteracted by such a slanted position.

Advantageously, the placement of the article 3 is also realized by a corresponding acceleration of the gripping device in the direction of the acceleration due to gravity. When the gripping device acceleration is slightly greater than the acceleration due to gravity, the article will slightly hover as a result of its inertia above the support surface 14 of the gripping fingers 13 so that the article 3 is released from the gripping device 6 by a prompt retraction of the gripping device from the article 3 and drops under the effect of the force of gravity onto a target surface. In this connection, the final position of the article 3 relative to the initial rotational orientation can be changed as desired. Also, flipping of the article 3 can be performed with the device according to the invention. When only a minimal free space is available, it can be advantageous to accelerate the gripping device first counter to the acceleration due to gravity in the upward direction in order to subsequently release the article from the gripping device surface by means of acceleration reversal in the direction of the acceleration due to gravity and retraction of the gripping device so that the article is deposited in this way.

It can be expedient for a safe fixation of the article 3 in the receptacle of the gripping device 6 to provide lateral support flanges 19 by which the lateral surfaces of the gripping device 6 are at least partially closed. The support flange 19 is positioned preferably at a lateral spacing s to the gripping fingers 13 and/or at a horizontal spacing h relative to the support surface 14 of the gripping fingers 13. It can be expedient to configure the support flanges 19 to be shorter than the gripping fingers 13. Expediently, the support flange 19 is longer than the leg 11 of the gripping device 6 forming the fastening flange. In order to securely manipulate even sensitive articles in a safe way, it can be expedient to provide an additional holding-down device 21 that, for example, can move out from the fastening leg 11 against the article 3.

Figure 4:
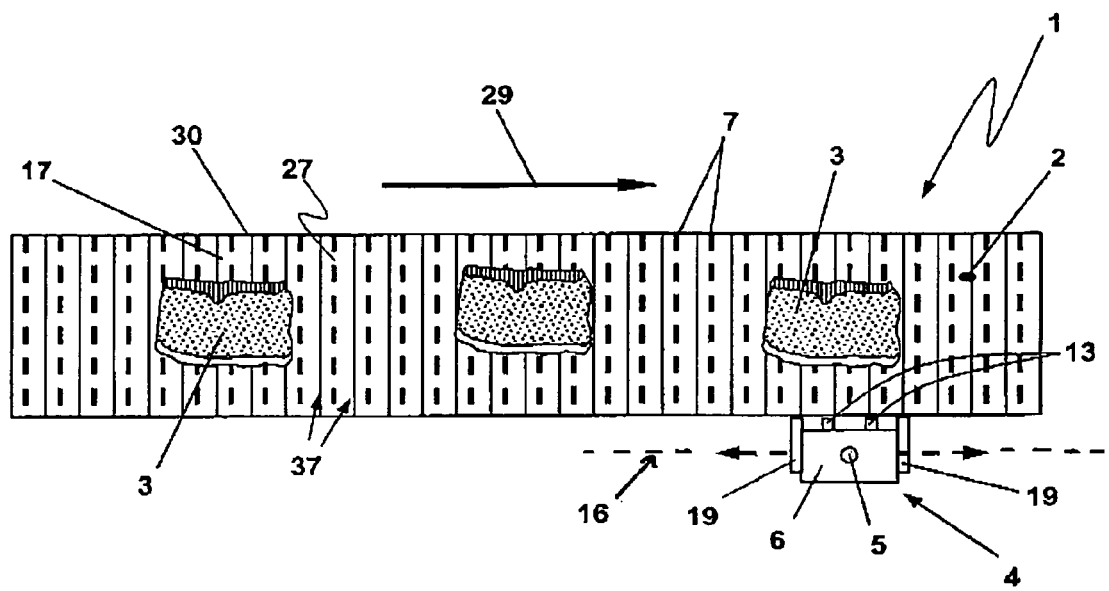
FIG. 4 is a plan view onto a device according to the invention having longitudinal stays extending transversely to the transport direction of the belt.
Figure 5:
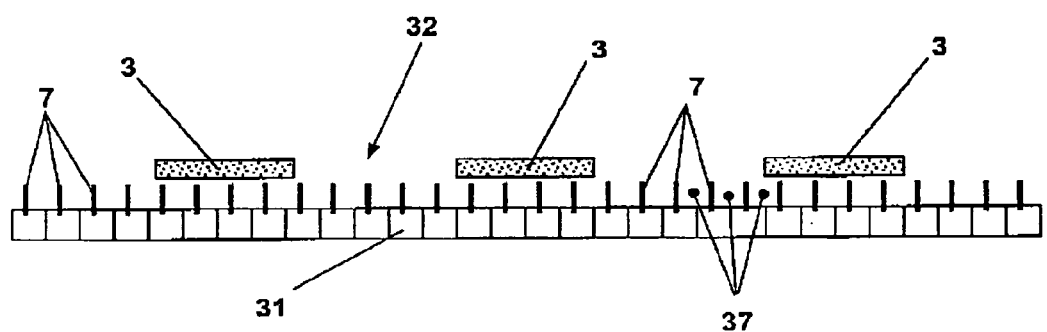
FIG. 5 is a side view of the belt according to FIG. 4

The device illustrated in FIGS. 4 and 5 show a conveyor belt 30 that is a belt band, a link chain or the like. In the illustrated embodiment, the conveyor belt 30 is designed as a link chain 31 having on the topside 32 facing the articles 3 longitudinal elements 7 that extend transversely to the transport direction 29 of the conveyor belt 30. In the illustrated embodiment, the longitudinal elements 7 are transverse stays while in the embodiment according to FIG. 1 the longitudinal elements 7 are longitudinal stays. The longitudinal elements 7 in the illustrated embodiment of FIGS. 4 and 5 are interrupted in their longitudinal extension so that each longitudinal element 7 has gaps 27. The gaps 27 of neighboring longitudinal elements 7 form longitudinal gaps 17 extending in the transport direction 29 while two adjacently positioned longitudinal elements 7 delimit a transverse stay 37. The transverse stay 37 forms a longitudinal gap of the conveyor belt 30 extending transversely to the transport direction 29.

The articles 3 resting on the longitudinal elements 7 can be picked up in the embodiment according to FIGS. 4 and 5 by a gripping device 6 of a manipulator 4 transversely to the transport direction 29 as well as longitudinally to the transport direction 29. The gripping fingers 13 engage either the longitudinal gaps (transverse gaps 37) extending transversely to the transport direction 29 or, when the gripping device 8 is aligned accordingly, the longitudinal gaps 17 extending in the transport direction 29 that are formed in the embodiment according to FIGS. 4 and 5 by the gaps 27 in the longitudinal elements 7 (transverse stays).

For engagement of the gripping device 6 transversely to the transport direction 29 there is the possibility of carrying out a movement of the gripping fingers 13 to the level of the transverse stays 37 adjacent to the conveyor belt 30 so that the articles 3 can be placed at a shorter spacing to one another in the transport direction 29 onto the conveyor belt 30. The free space required between the articles 3 on the belt 30 can be minimized.

When the gripping device 6 is lowered to the level of the longitudinal stays 7, the gripping device 6 enters the gaps transversely to the transport direction 29 of the conveyor belt 30 and is moved at the same time at the speed of the belt 30 in the transport direction 29 so that picking up the article 3 from the belt is possible. Preferably, the gripping fingers 13 engage adjacently positioned (neighboring) gaps. It can also be advantageous when the gripping fingers 13 engage only every other gap.

Figure 6:
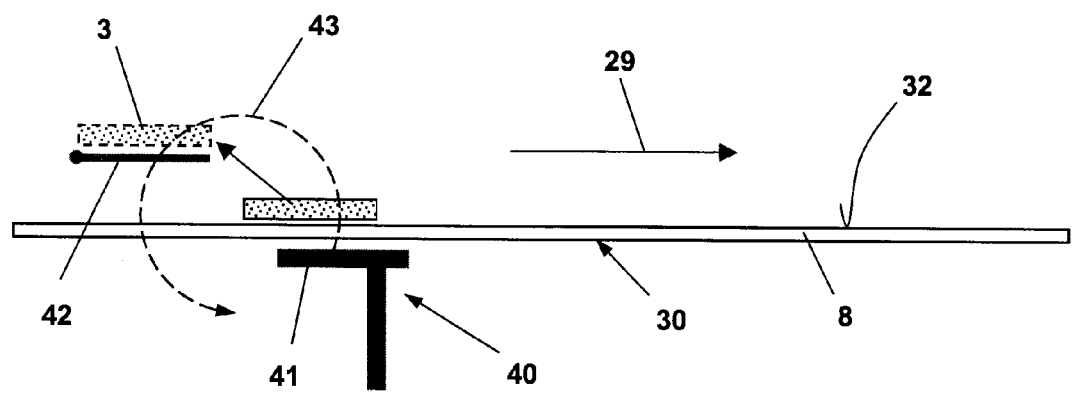
FIG. 6 is a side view of a device according to the invention including an intermediate support.

In the embodiment according to FIGS. 6 and 7, a conveyor belt according to FIG. 1 is illustrated that is preferably formed as a strap belt. The individual straps 8 form in the sense of the invention the longitudinal elements 7 and are positioned with lateral spacing relative to one another so that between the straps 8 gaps 17 are formed that extend in the transport direction 29 of the straps 8. Underneath the conveyor belt 30 that is formed of the straps 8 a lifting device 40 is arranged that is comprised of adjacently positioned fingers 41 that can pass through the longitudinal gaps 17 of the conveyor belt 30 in order to lift an article 3 off the topside 32 of the conveyor belt 30 and place it onto an intermediate support 42, as illustrated in FIG. 6. The movement of the lifting device 40 embodied as a fork hand is realized similar to a circular movement as is illustrated in a dashed line referenced by reference numeral 43.

The gripping device 6 picks up the intermediately stored article 3 from the intermediate support 42 and places it back onto the conveyor belt 30 in order to increase the density of articles on the belt. Such an active transfer device can be integrated into the conveyor belt 30 in order to optimally utilize the capacity of such a device.

While specific embodiments of the invention have been shown and described in detail to illustrate the inventive principles, it will be understood that the invention may be embodied otherwise without departing from such principles.

What is claimed is:

1. A device for automated manipulation of articles along a predetermined movement path, the device comprising:
    a working area having a working surface for articles;
    a manipulator arranged in the working area and comprising a pick-up device for moving the articles;
    wherein the working surface is comprised of neighboring longitudinal elements, wherein longitudinal gaps are formed between the neighboring longitudinal elements;
    wherein the pick-up device has at least one pick-up finger configured to be lowered into the longitudinal gaps between the neighboring longitudinal elements and to move into a position underneath an article for picking up the article;
    wherein the article is essentially secured in the pick-up device by a combination of acceleration forces generated along a movement path of the pick-up device and of the force of gravity.

2. The device according to claim 1, wherein the article is released from the at least one pick-up finger by accelerations of the pick-up device in the direction of the acceleration due to gravity and is placed onto a predetermined target location by prompt retraction of the pick-up device from the article.

3. The device according to claim 2, wherein the acceleration of the pick-up device is greater than the acceleration due to gravity.

4. The device according to claim 1, wherein the pick-up device is comprised exclusively of components arranged rigidly and immobile relative to one another.

5. The device according to claim 1, wherein the pick-up device has a pivot axis extending approximately parallel to the working surface and is configured to tilt about the pivot axis.

6. The device according to claim 1, wherein the pick-up device is U-shaped comprising a stay and a first and a second legs connected to ends of the stay, wherein the stay determines a receiving width of the pick-up device for the article, wherein the first leg is formed by the pick-up finger, wherein the second leg is a fastening leg configured to connect the pick-up device to a manipulator arm, and wherein a connecting area where the fastening leg and the manipulator arm are connected is positioned above a center of gravity of the pick-up device.

7. The device according to claim 1, wherein the pick-up device has a lateral support flange for closing at least partially a lateral surface of the pick-up device, wherein the support flange is preferably shorter than the at least one pick-up finger.

8. The device according to claim 7, wherein the lateral support flange is positioned at least at one of a lateral spacing and a horizontal spacing relative to the at least one pick-up finger neighboring the lateral support flange.

9. The device according to claim 1, wherein the working surface is comprised at least partially of a strap belt.

10. The device according to claim 1, wherein the working surface is a conveyor belt and the articles to be manipulated are transported on the conveyor belt into the working area of the pick-up device.

11. The device according to claim 10, wherein the longitudinal elements are connected to the conveyor belt such that the longitudinal elements and the longitudinal gaps are aligned transversely to a transport direction of the conveyor belt, wherein the pick-up device for picking up the article moves transversely to the transport direction of the conveyor belt into the position underneath the article.

12. The device according to claim 11, wherein the pick-up device for picking up the article is moved at the same time in the transport direction of the conveyor belt.

13. The device according to claim 10, further comprising an intermediate support onto which the article is lifted.

14. The device according to claim 13, further comprising a lifting device for lifting the article, wherein the lifting device is arranged underneath the working surface and is configured to pass upwardly through the longitudinal gaps between the longitudinal elements forming the conveyor belt.

15. The device according to claim 13, wherein the intermediate support is positioned above the working surface.

* * * * *